United States Patent
Schade et al.

(10) Patent No.: US 9,612,394 B2
(45) Date of Patent: Apr. 4, 2017

(54) FIBRE-OPTIC SENSOR AND USE THEREOF

(71) Applicant: Fraunhofer Gesellschaft Zur Förderung Der Angew. Forschung E.V., München (DE)

(72) Inventors: Wolfgang Schade, Goslar (DE); Jörg Burgmeier, Osterode (DE)

(73) Assignee: Fraunhofer Gesellschaft Zur Forderung Der Angew. Forschung E.V., Munich (DE)

( * ) Notice: Subject to any disclaimer, the term of this patent is extended or adjusted under 35 U.S.C. 154(b) by 0 days.

(21) Appl. No.: 14/779,998

(22) PCT Filed: Mar. 18, 2014

(86) PCT No.: PCT/EP2014/055389
§ 371 (c)(1),
(2) Date: Sep. 25, 2015

(87) PCT Pub. No.: WO2014/154528
PCT Pub. Date: Oct. 2, 2014

(65) Prior Publication Data
US 2016/0047976 A1    Feb. 18, 2016

(30) Foreign Application Priority Data

Mar. 25, 2013    (DE) .................. 10 2013 205 205

(51) Int. Cl.
*G02B 6/00*    (2006.01)
*G02B 6/02*    (2006.01)
(Continued)

(52) U.S. Cl.
CPC .............. *G02B 6/021* (2013.01); *G01B 11/18* (2013.01); *G01D 5/268* (2013.01); *G01D 5/3538* (2013.01);
(Continued)

(58) Field of Classification Search
USPC ..................................... 385/12, 37
See application file for complete search history.

(56) References Cited

U.S. PATENT DOCUMENTS

| | | |
|---|---|---|
| 5,142,660 A | 8/1992 | Chang et al. |
| 5,563,967 A | 10/1996 | Haake |
| | (Continued) | |

FOREIGN PATENT DOCUMENTS

| | | |
|---|---|---|
| EP | 0250194 A2 | 12/1987 |
| JP | H02157620 A | 6/1990 |
| | (Continued) | |

OTHER PUBLICATIONS

International Search Report dated Apr. 9, 2014 (PCT/EP2014/055389).

(Continued)

*Primary Examiner* — Eric Wong
(74) *Attorney, Agent, or Firm* — Alix, Yale & Ristas, LLP

(57) ABSTRACT

The invention relates to a fiber-optic sensor comprising an optical waveguide having at least one first core and a cladding surrounding the first core, wherein the first core extends substantially over the entire length of the optical waveguide, wherein the sensor has at least one second core which is at least partly surrounded by the cladding, wherein the longitudinal extent of the second core is less than the total length of the optical waveguide and at least one Bragg grating is introduced into the second core. Furthermore, the invention relates to a use of the fiber-optic sensor.

22 Claims, 4 Drawing Sheets

(51) Int. Cl.
    *G01D 5/353* (2006.01)
    *G01B 11/16* (2006.01)
    *G01D 5/26* (2006.01)
(52) U.S. Cl.
    CPC ..... *G01D 5/35316* (2013.01); *G01D 5/35374* (2013.01); *G01D 5/35387* (2013.01); *G02B 6/02042* (2013.01)

(56) References Cited

U.S. PATENT DOCUMENTS

| | | | |
|---|---|---|---|
| 6,563,968 B2* | 5/2003 | Davis | G01L 1/246 |
| | | | 385/12 |
| 7,813,599 B2 | 10/2010 | Moore | |
| 2004/0234218 A1* | 11/2004 | Tao | B29D 11/00721 |
| | | | 385/126 |
| 2006/0013523 A1 | 1/2006 | Childlers et al. | |
| 2007/0297712 A1 | 12/2007 | Meneghini et al. | |
| 2009/0217769 A1 | 9/2009 | Roberts | |
| 2014/0061452 A1 | 3/2014 | Schade | |

FOREIGN PATENT DOCUMENTS

| | | |
|---|---|---|
| JP | H0854511 A | 2/1996 |
| WO | 2011084557 A2 | 7/2011 |
| WO | 2011154701 A1 | 12/2011 |

OTHER PUBLICATIONS

Martinez, Amos et al., "Vector Bending Sensors Based on Fiber Bragg Gratings Inscribed by an Infrared Femtosecond Laser," Photonics Research Group, Aston University, Birmingham, UK, Optical Society of America 2005.

* cited by examiner

FIBRE-OPTIC SENSOR AND USE THEREOF

FIELD OF THE DISCLOSURE

The invention relates to a fiber-optic sensor having an optical waveguide which has at least one first core and a cladding surrounding the first core, wherein the first core extends substantially over the entire length of the optical waveguide. The invention also relates to the use of this sensor.

BACKGROUND

It is known from U.S. Pat. No. 7,813,599 B2 to equip an optical waveguide with three cores. Each of these cores shall have a plurality of Bragg gratings. Part of the light coupled into the cores is reflected on the fiber gratings and part thereof is transmitted. The reflected wavelength and/or the reflected wavelength range depend on the grating constants of the Bragg grating.

The grating constant, in turn, is determined when the Bragg grating is produced and, after the production thereof, the constant is changed under the influence of mechanical tension or temperature. If the optical waveguide has a curvature, the three cores include different radii of curvature, and therefore each core has a different mechanical tension. For example, a core which is closer to the curvature center is compressed and a core which is farther away from the curvature center is stretched. As a result, the form of the optical waveguide in space can be determined by determining the wavelengths reflected by the Bragg gratings.

However, this known sensor has the drawback that it requires a costly optical system to couple light in and out of three cores. Since the three cores have to be read out individually, the demands made on the spectrometric device of the respectively reflected wavelengths are increased. If the form of the optical waveguide changes with time, the measurement of the reflected spectra from all cores also has to be synchronized.

SUMMARY

On the basis of this known sensor, the object of the invention is to provide a fiber-optic sensor which is easy to produce and can be operated with little effort.

This object is achieved according to the invention by a fiber-optic sensor according to claim 1 and a use according to claim 13.

The fiber-optic sensor has at least one optical waveguide. In some embodiments of the invention, the fiber-optic sensor can have exactly one optical waveguide. The optical waveguide can have a substantially cylindrical outer contour and extend, with its longitudinal extension, along a tool, e.g. along an endoscope or along a catheter. If the endoscope or the catheter does not have a linear form, the precise form of the tool can be detected in space by determining the curvature of the fiber-optic sensor. If the absolute coordinate or position of one point is known, the absolute position of all parts and/or sections of the tool can be determined as well. In addition, the tool can be navigated by comparing the actual form of the tool with deposited map data. The map data can contain a geological profile, for example, as a result of which the course of a drilled hole and/or the position of a drilling tool can be determined. The map data can be data of the vascular system of a human or animal body, for example, so as to be able to determine the position of a catheter in the body.

In other embodiments of the invention, the fiber-optic sensor can be part of a glass or plastics plate. In yet another embodiment of the invention, the fiber-optic sensor can be part of a vessel or a conduit so as to be able to determine the form of this conduit and/or the concentration of presettable molecules in the vicinity of the fiber-optic sensor.

The optical waveguide has at least one first core which extends substantially over the entire length of the optical waveguide. The first core is surrounded by a cladding which has a lower refractive index than the at least one core. As a result, light which is coupled into the core can be guided by total reflection at the boundary between core and cladding along the longitudinal extension of the optical waveguide. In some embodiments of the invention, the core and the cladding can consist of quartz glass, wherein the refractive index of the core differs from the refractive index of the cladding by doping using germanium or phosphorus.

In other embodiments of the invention, the optical waveguide can consist of polymer materials, wherein the desired ratio of the refractive indexes between core and cladding is obtained by a different composition, different cross-linkage or doping.

A geometrically defined boundary can be formed between core and cladding. In other embodiments of the invention, the core can change continuously into the cladding, thus leading to an effective core diameter as a function of the wavelength and/or the angle of incidence.

In some embodiments of the invention, an optional protective coating can be applied to the exterior of the cladding, said coating preventing the penetration of scattered light and/or increasing the mechanical load capacity of the optical waveguide and/or facilitating the attachment and/or the embedding at or in the tool.

According to the invention, it is now proposed that the sensor has at least one second core which is at least partly surrounded by the cladding and the longitudinal extension of which is less than the entire longitudinal extension of the optical waveguide.

This second core shall have at least one Bragg grating. When the fiber-optic sensor is operated, light is coupled into the first core and passes through the longitudinal extension of the optical waveguide. Part of the optical performance guided in the first core can enter into the second core by an evanescent coupling at presettable sites where a second core is introduced. Due to the different refractive indexes in the second core and in the cladding surrounding said core, part of the light is then guided in the second core. A presettable wavelength range is reflected on the Bragg grating. The reflected light can, in turn, enter into the first core and be detected at the end of the optical waveguide.

In order to measure the curvature and/or the temperature and/or influencing mechanical tensions at several locations of the optical waveguide, it is possible to introduce several second cores each having assigned Bragg gratings into the cladding of the optical waveguide. Nevertheless, the optical waveguide can simply contact a spectrometer and a light source since the optical waveguide only has a relatively small number of first cores at the end thereof. If the optical waveguide only has a single first core, contacting can be made in a generally known way using devices and methods known from optical information transmission. This renders the signal read-out and generation particularly simple and reliable.

In some embodiments of the invention, the first core can be arranged on the axis of symmetry of the optical waveguide. If the optical waveguide has a rotation-cylindrical cross-section, the first core can be arranged in concentric fashion relative to the surrounding cladding. This embodiment has the advantage that the first core forms a neutral fiber in the optical waveguide and thus remains largely unaffected by mechanical influences.

In some embodiments of the invention, the longitudinal extension of the second core can have at least one first longitudinal portion, at least one second longitudinal portion and at least one third longitudinal portion. In this case, the first longitudinal portion is adapted to enable an optical coupling between the second core and the first core, the third longitudinal portion is adapted to be guided in the cladding at a distance from the first core and to receive at least one Bragg grating, wherein the second longitudinal portion connects the first longitudinal portion and the third longitudinal portion with each other. This embodiment has the advantage that the response characteristic of the sensor can be adjusted by the distance of the third longitudinal portion from the axis of symmetry of the optical waveguide, i.e. the fiber-optic sensor can either detect small deformations with high accuracy or cover a large range of deformation with its measurement range. Since the third longitudinal portion can also be spaced from the first core to such an extent that no light can enter into the second core, an undisturbed measurement can be made. Compared thereto, the first longitudinal portion of the second core is intended to enable a defined transfer of the light between the cores. On the one hand, this concerns the radiation coupled into the first core and, on the other hand, the radiation which is reflected by the Bragg grating and which can reliably reach the first core and thus the read-out spectrometer.

In some embodiments of the invention, the at least one second core can be produced by processing the material of the cladding of the optical waveguide by means of a laser. In some embodiments of the invention, a short-pulse laser can be used for this purpose, i.e. a laser which emits individual pulses or pulse trains having a duration of less than one picosecond or less than 100 femtoseconds. The depth of the material modification in the cladding can be adjusted by a focusing optical system which can produce a different focal position. A continuous second core can be produced from individual dots exposed by the laser in the cladding of the optical waveguide by laterally displacing or relatively moving optical waveguide and laser.

In some embodiments of the invention, it is also possible to produce at least one Bragg grating in at least one core by processing the material using laser radiation. For this purpose, volumes of space having a different refractive index are produced in at least one core. The distance of a plurality of such volumes of space defines the grating constant of the Bragg grating which determines the reflected wavelength and/or the reflected wavelength range. This grating constant is changed by a temperature change, stretching or compression of the core, and therefore it is possible to detect deformation, mechanical tension or temperature change by changing the transmitted or reflected wavelength.

In some embodiments of the invention, the sensor has a plurality of second cores, all of which have a third longitudinal portion and are arranged at least at two different distances and/or relative to the axis of symmetry of the optical waveguide. This feature has the effect that, with a presettable deformation, second cores which are farther outside are stretched or compressed more extensively than cores that are farther inside. Thus, large deformations having a great dynamic range can be measured by second cores which are closer to the axis of symmetry of the optical waveguide. However, small deformations can be determined with great accuracy by the farther outside cores.

In some embodiments of the invention, Bragg gratings can be arranged in the second cores and in the first core at one site, i.e. at a point of the longitudinal extension of the optical waveguide. If the first core is located on the axis of symmetry and thus in the neutral fiber of the optical waveguide, the Bragg grating in the first core remains unaffected by mechanical deformation. However, all Bragg gratings change their grating constants with changing temperature, and therefore the signal of the Bragg grating of the first core can be used for compensating the temperature of the measuring signals of the second cores.

In some embodiments, the first core can be adapted to produce a broadband light when it is excited with monochromatic laser radiation. In some embodiments of the invention, this can be effected because the first core contains a dopant. In some embodiments of the invention, the dopant can be erbium and/or ytterbium. This embodiment of the invention has the advantage that a plurality of Bragg gratings of different grating constant can be read out by broadband or white light. This broadband light can be produced with great efficiency inside the first core by induced emission. If an intense laser light source is used for optically pumping the first core, the broadband radiation produced in the first core of the optical waveguide can have a higher intensity than a radiation which can be produced e.g. by means of a superluminescence diode outside the optical waveguide. As a result of this, the signal/noise ratio can be improved in some embodiments of the invention.

In some embodiments of the invention, the first longitudinal portion of the second core can geometrically overlap a part or a segment of the first core. Since both cores therefore geometrically occupy at least part of the same space and the coupled-in light is guided in the first core, this leads to a very efficient transfer of light from the first core into the second core.

In some embodiments of the invention, the first longitudinal portion of the second core can have a distance of less than 3 µm or less than 2.5 µm or less than about 2 µm from the first core. In this case, light can enter by an evanescent coupling from the first core into the second core and from the second core into the first core. Since the second longitudinal portion of the second core increasingly diverges from the first core, the coupling quickly becomes weaker, and therefore there is no longer an essential coupling between the cores in the third longitudinal portion.

In some embodiments of the invention, the third longitudinal portion of at least one second waveguide can have a distance of less than about 10 µm or less than about 5 µm or less than about 3 µm or less than about 2 µm or less than about 1 µm from the lateral surface of the optical waveguide. Light which is guided in such a second core close to the surface of the optical waveguide can be influenced by adhering adsorbates. In this way, it is possible to determine the concentration of presettable molecules in the vicinity of the sensor. A small concentration of these molecules leads to a weak adherence to the lateral surface of the optical waveguide and thus to a minor influence of the optical signal guided in the second core. Conversely, an increased concentration results in an increased adherence to the lateral surface and thus to a greater influence of the optical signal in the second core of the sensor.

In some embodiments of the invention, at least one subarea of the lateral surface of the optical waveguide can be functionalized. This functionalization has the effect that presettable molecules, the concentration of which shall be determined, adhere increasingly to the lateral surface. At the same time, the adherence of other molecules can be suppressed so as to increase the sensitivity of such a sensor.

In some embodiments of the invention, the third longitudinal portion can have at least two Bragg gratings, which have different grating constants and thus different resonance frequencies. In some embodiments of the invention, the distance of two Bragg gratings can be about 3 mm to about 10 mm in a second core. In some embodiments of the invention, a Bragg grating can be formed in such a way that the wavelength reflected by it resonates with an optical excitation of the molecule to be detected. However, the wavelength reflected by the second Bragg grating cannot resonate. In this way, it is very easy to determine the particle density on the lateral surface of the optical waveguide via an evaluation of the intensity ratio of the reflected light.

In some embodiments of the invention, a plurality of second cores can be guided close to the surface of the optical waveguide, wherein different subareas of the lateral surface of the optical waveguide can be functionalized in different ways. This enables the detection of different molecules with a single sensor.

If a plurality of second cores is guided close to the surface of the optical waveguide, the concentration of presettable molecules can be determined in spatially resolved fashion at different sites along the longitudinal extension of the optical waveguide.

In some embodiments of the invention, several second cores having respectively assigned Bragg gratings can be arranged in a longitudinal portion and/or in a site of the optical waveguide. In some embodiments of the invention, the angle enclosed in a radial direction between two adjacent second cores can be between about 90° and about 180°. In other embodiments of the invention, the angle enclosed in a radial direction between two second cores can be between about 90° and about 120°. In yet another embodiment of the invention, the angle enclosed in a radial direction between two adjacent second cores can be between about 110° and about 130°.

The deformation can be measured in all spatial directions by a plurality of second cores, and therefore the proposed sensor can be localized three-dimensionally in space. If a localization is merely necessary in one plane, fewer second cores can be available in the optical waveguide of the sensor and then also enclose a different angle relative to one another.

BRIEF DESCRIPTION OF THE DRAWINGS

The invention shall be explained in more detail below by means of drawings without limiting the general inventive concept. In these drawings.

DETAILED DESCRIPTION

Figure 1:
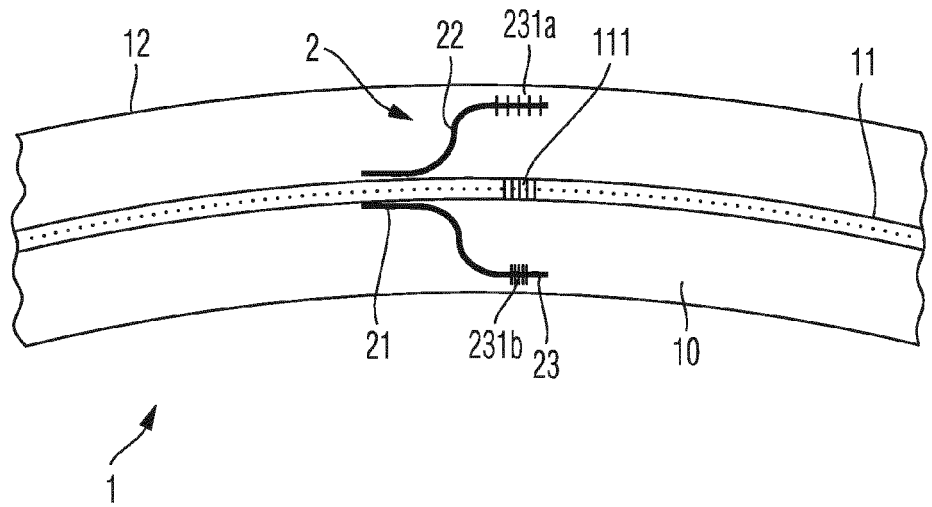
FIG. 1 shows a section from a first embodiment of the proposed sensor.

FIG. 1 shows a first embodiment of the invention. FIG. 1 shows a section of a fiber-optic sensor 1. The fiber-optic sensor 1 contains an optical waveguide 12. The optical waveguide 12 comprises a cladding 10 having a core 11. In the exemplary embodiment shown, the cross-section is circular, and therefore the optical waveguide 12 has an approximately cylindrical outer contour.

The first core 11 is arranged in concentric fashion relative to the cladding 10, i.e. the first core 11 is located on the axis of symmetry of the optical waveguide 12. The first core 11 extends substantially over the entire length of the optical waveguide 12. This does not rule out that the first core 11 is only guided at one end of the optical waveguide 12 to the end thereof where it is connected to an optical and/or electronic circuit for signal read-out and signal generation. On the opposite end, the optical waveguide can also terminate in the material of the cladding 10, and therefore a further longitudinal portion of the optical waveguide 12 is present in which the first core 11 is missing.

Furthermore, the fiber-optic sensor 1 has two second cores 2. In the exemplary embodiment shown, a second core is arranged in the upper half of the optical waveguide 12 and a second core 2 is arranged in the lower half of the optical waveguide 12. The actual situation inside the optical waveguide is explained in more detail below by means of FIG. 7. Even if two second cores 2 are shown in FIG. 1, they do not necessarily have to lie within the same cutting plane. The refractive index of the second cores differs from the refractive index of the surrounding cladding, as a result of which light can be reflected on the boundary.

Each second core 2 has a first longitudinal portion 21, a second longitudinal portion 22 and a third longitudinal portion 23. The first longitudinal portion 21 is adapted to receive light by an evanescent coupling, said light being guided in the first core 11. At the same time, light guided in the second core 2 can be introduced by an evanescent coupling into the first core 11.

The third longitudinal portion 23 has a greater distance from the first core 11. As a result, an optical coupling is avoided between the cores in the third longitudinal portion 23. One assigned Bragg grating 231a or 231b each is found in the third core 23.

The second longitudinal portion 22 connects the first longitudinal portion 21 to the third longitudinal portion 23. As a result, light which is guided in the first core 11 is guided via the first longitudinal portion 21 and the second longitudinal portion 22 and the third longitudinal portion 23 where part of the electromagnetic radiation is reflected on the respective Bragg grating 231, as a result of which this fraction of light is again guided through the second longitudinal portion 22 into the first longitudinal portion 21 where it enters into the first core 11 by an evanescent coupling. The reflected light continues to propagate to the end of the waveguide 12 where it can be detected by means of a spectrometer.

The wavelength reflected by the Bragg grating 231a and/or 231b depends on the grating constant of the Bragg grating, which can, in turn, be influenced by mechanical tension. As shown in FIG. 1, the lower Bragg grating 231b is compressed and the upper Bragg grating 231a is stretched at a curvature of the optical waveguide 12. Thus, the curvature of the optical waveguide 12 can be determined by the change in the reflected spectrum, and therefore the fiber-optical sensor 1 operates as a one- or multi-dimensional positional sensor.

The first core 11 contains another optional Bragg grating 111 which is arranged at approximately the same site of the longitudinal extension of the optical waveguide 12. Since the first core 11 is arranged in the center of the optical waveguide 12, it undergoes no change in length as a neutral fiber at the curvature of the optical waveguide 12. However, if a change in the reflected spectrum is detected, it is due to a change in the temperature and the resulting changes in the refractive index and the length of the optical waveguide 12. Thus, the measured values obtained on the optional Bragg grating 111 can be used for compensating the temperature of the measured values of the Bragg gratings 231a and 231b.

Figure 2:
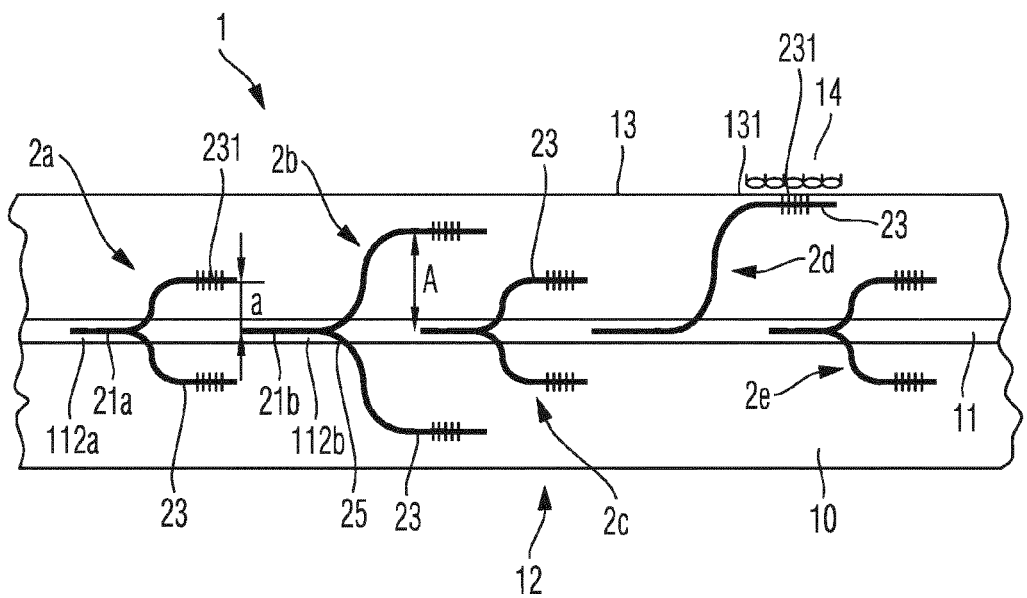
FIG. 2 shows a section from a second embodiment of the sensor according to the invention.

FIG. 2 shows the cross-section through a second embodiment of the invention. Equal components of the invention have equal reference signs, and therefore the description is limited to the essential differences.

The fiber-optical sensor 1 according to the second embodiment also comprises an optical waveguide 12. A first core 11 is formed in the optical waveguide 12 and is located on the axis of symmetry or in the center of the optical waveguide 12. Second cores 2a, 2b, 2c, 2d and 2e are formed in the surrounding cladding 10. These cores, too, do not necessarily have to lie in the cutting plane, as already explained above.

In order to couple the light guided in the first core 11 into the second cores 2a, 2b, 2c, 2d and 2e, the first longitudinal portion 21 of the second cores 2 has in each case a geometric overlap with a segment 112 of the first core 11. For example, the first longitudinal portion 21a of the second cores 2a overlaps a longitudinal portion 112a of the first core 11. Furthermore, the first longitudinal portion 21b of the second core 2b overlaps a longitudinal portion 112b of the first core 11. Therefore, light which is guided in the first core 11 can be coupled into the second core 2 in a simple way and with high efficiency.

Furthermore, each of the second cores has a branch and/or bifurcation 25. Thus, a plurality of second cores 2 can have a common first longitudinal portion 21. Then, an assigned second longitudinal portion 22 and a third longitudinal portion 23 starts at the bifurcation 25.

FIG. 2 also shows that the third longitudinal portions 23 of the second cores 2a, 2c and 2e have a smaller distance a from the axis of symmetry of the optical waveguide 12. On the contrary, the third longitudinal portions 23 of the second cores 2b have a greater distance A from the axis of symmetry. Therefore, the second cores 2a, 2c and 2e can detect a large area of curvature or deformation. The second cores 2b are suitable to detect a smaller area of curvature having greater resolution and thus higher accuracy.

Finally, FIG. 2 shows a second core 2d, which serves for detecting molecules 14. The molecules 14 can be a constituent of the atmosphere surrounding the optical waveguide or be dissolved in an aqueous solution in which the optical waveguide 12 is immersed.

The lateral surface 13 has at least one subarea 131 which was functionalized, i.e. the subarea 131 is made in such a way that the molecules 14 preferably adhere to this subarea and/or that the attachment of other molecules to the subarea 131 is reduced or avoided.

The third longitudinal portion 23 of the second core 2g is located at a distance of less than 10 μm from below the lateral surface 13. At least part of the light which is guided in the third longitudinal portion 23 can escape from the cladding 10 of the optical waveguide 12 and can be absorbed by the molecules 14 in a resonating way. A Bragg grating 231 in the third longitudinal portion 231 in the third longitudinal portion 23 of the second cored 2d serves for filtering a wavelength which is selectively absorbed by the molecules 14 and therefore can be used as an evidence for the presence of these molecules.

Figure 3:
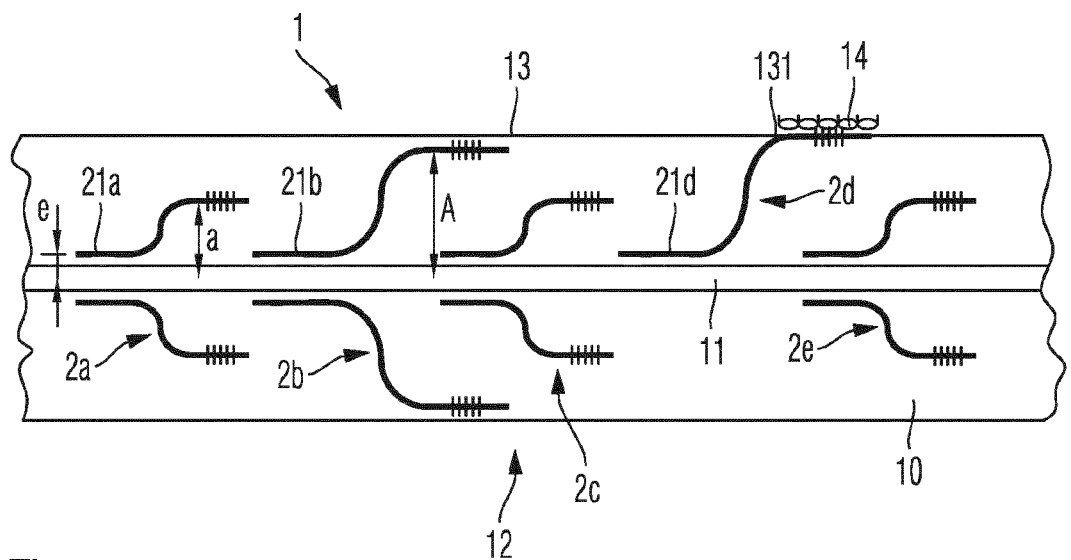
FIG. 3 shows a section from a third embodiment of the sensor according to the invention.

FIG. 3 shows a third embodiment of the present invention. Equal parts of the invention are provided with equal reference signs, and therefore the subsequent description is limited to the essential differences.

The third embodiment also has a waveguide 12 which has a first core 11 and a plurality of second cores 2a, 2b, 2c and 2e. In this connection, the second cores 2a, 2c and 2e are adapted to measure large deformations with small resolution and the second core 2b is adapted to detect small deformations with high resolution. Finally, a second core 2d is provided to detect molecules 14 on a subarea 131 of the cladding 13.

The essential difference with respect to the second embodiment consists in arranging the first longitudinal portions 21a, 21b, 21c, 21d and 21e of the second cores 2a, 2b, 2c, 2d and 2e at a distance e from their edge and the edge for the first core 11. The distance e can be less than 3 micrometers, less than 2.5 μm or less than 2 μm, for example. In some embodiments of the invention, the distance e is less than about 3 wavelengths or less than about 2 or less than about 1 wavelength of the light guided in the first core. As a result, light can be introduced from the first core into the second core and from the second core into the first core by an evanescent coupling.

Figure 4:
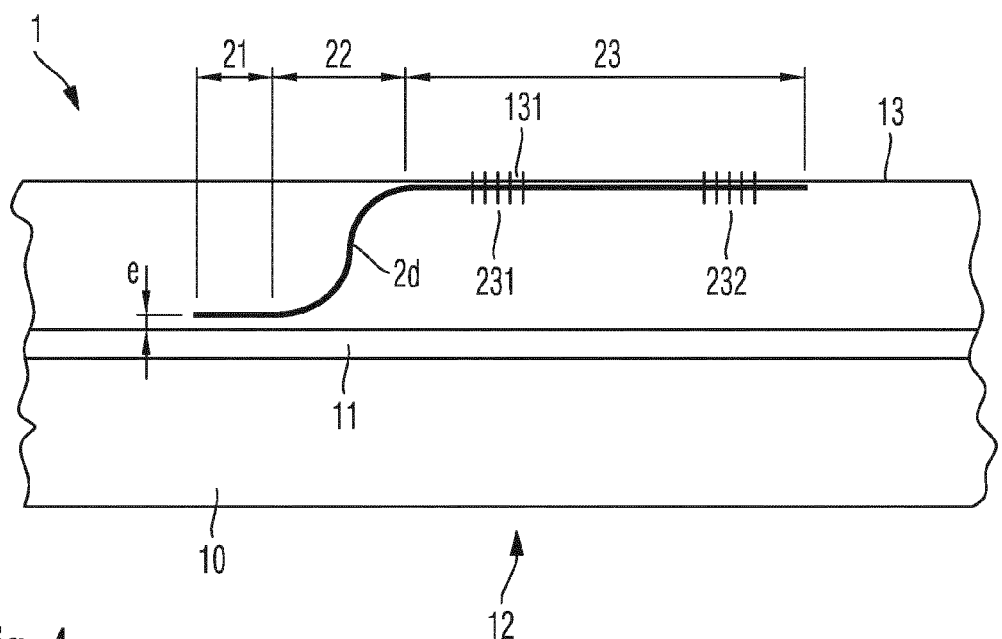
FIG. 4 shows an enlarged section of the third embodiment of the present invention.

FIG. 4 shows a section of FIG. 3. A second core 2d is shown, the third longitudinal portion 23 of which is guided close to the surface 13 of the cladding 10 of the optical waveguide 12. For example, the third longitudinal portion 23 of the second core 2d can have a distance of less than about 10 μm or less than about 5 μm or less than about 3 μm or less than about 2 μm or less than about 1 μm from the lateral surface 13 of the optical waveguide 12.

A subarea 131 of the lateral surface 13 can be functionalized to facilitate the absorption of presettable molecules from the gas phase or an aqueous solution. If the molecules to be detected are bound or adsorbed to the subarea 131, electromagnetic radiation can excite an electronic transition of the molecule, and therefore the radiation is absorbed and the adhering molecules can be detected by means of spectroscopy. This is elucidated in FIG. 5 once again. In this connection, the intensity of the electromagnetic radiation is plotted on the ordinate and the wavelength is plotted on the abscissa.

Figure 5:
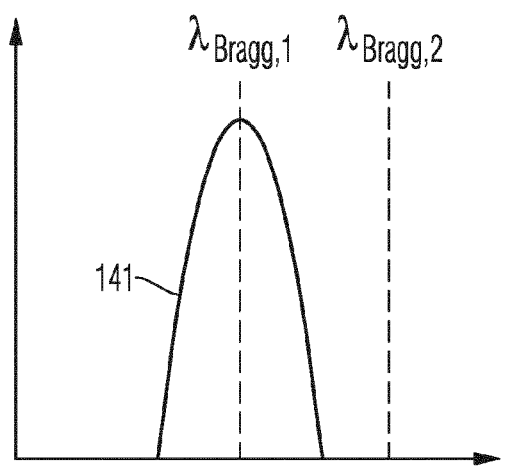
FIG. 5 explains the measuring principle for detecting presettable molecules.

The two Bragg gratings 231 and 232 have a different grating constant referred to as $\lambda_{Bragg\ 1}$ and $\lambda_{Bragg\ 2}$ in FIG. 5. Furthermore, the absorption band 141 of a molecule to be detected is evident in FIG. 5. The two Bragg gratings 231 and 232 thus reflect different fractions of the electromagnetic spectrum which is guided via the first core 11 and the first longitudinal portion 23 to the second core 2d into the third longitudinal portion 23. The intensity ratio can be determined by means of the evaluation circuit 3, and therefore the presence of the molecules 14 can directly be inferred from the intensity ratio. A relatively large number of molecules here effects a greater attenuation of the signal, and therefore the concentration of the molecules in the vicinity of the sensor 1 can be inferred from the intensity ratio. In other embodiments of the invention, a displacement of the wavelength reflected and/or transmitted by the Bragg grating, said displacement being induced by absorbed and/or adsorbed molecules, can be detected by means of the evaluation circuit 3 in order to determine the concentration.

Figure 6:
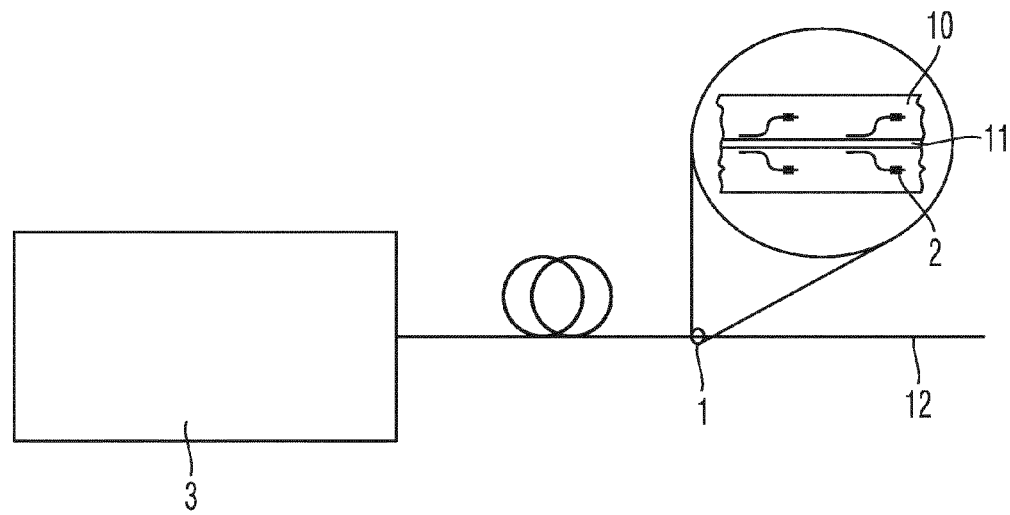
FIG. 6 shows the signal generation and read-out.

FIG. 6 explains once again the signal read-out and generation. For this purpose, the optical waveguide 12 is connected via the sensor 1 to an evaluation circuit 3. The evaluation circuit 3 contains a light source, e.g. a semiconductor laser or a superluminescence diode. If the light source comprises a semiconductor laser, e.g. having a wavelength of about 980 nm, the first core 11 can be doped in such a way that light of greater spectrum and/or greater wavelength can be produced in core 11. Due to this, several different Bragg gratings 231 and 232 can be read out.

In order to determine the intensity and/or wavelength and/or the transit time of reflected radiation, the evaluation circuit 3 can additionally contain a spectrometer and/or an apparatus for determining the signal transit time. Finally, the obtained measured values can be digitalized and/or further processed analogously or digitally and be emitted to an apparatus (not shown) for data storage and/or visualization.

Figure 7:
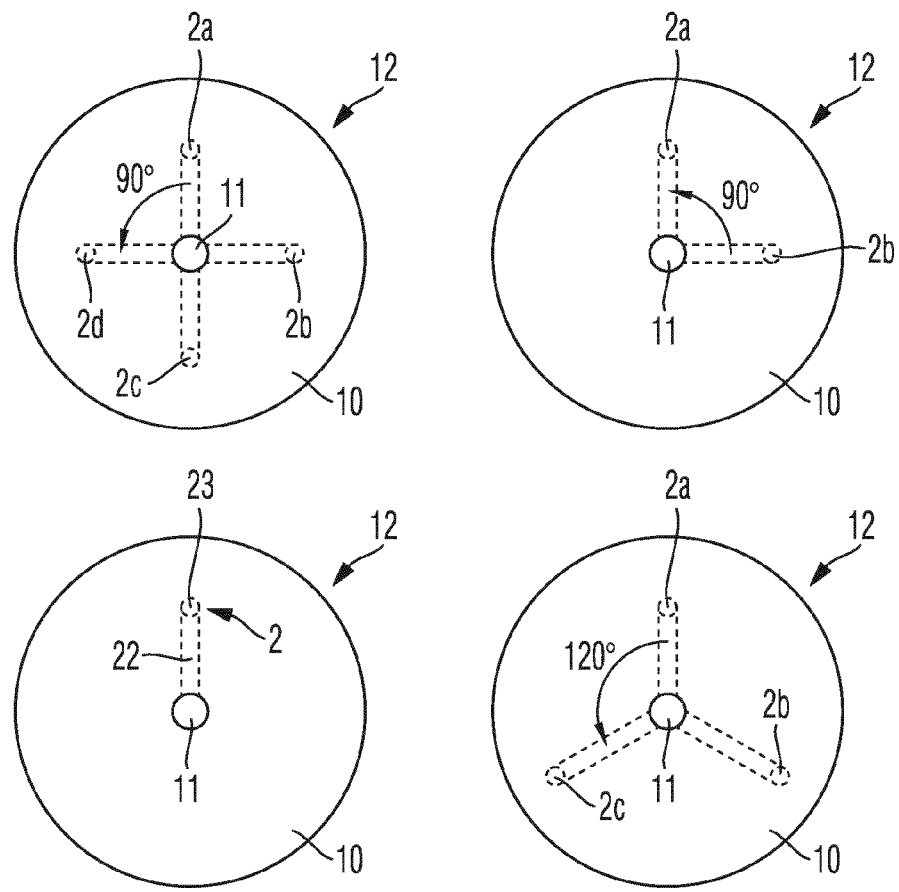
FIG. 7 shows different embodiments of the cross-section of a rotationally symmetric sensor.

FIG. 7 shows a cross-section through different embodiments of the sensor according to the present invention. One optical waveguide 12 is shown in each case and has a first core 11 and a cladding 10 surrounding this core concentrically. In addition, the sensor contains one, two, three or four second cores 2, 2a, 2b, 2c and 2d. They can be arranged substantially equidistantly in a radial direction or can be asymmetric. For example adjacent second cores can enclose an angle of about 90° or about 120°. If at least two second cores are available, a deformation of the sensor 10 can be detected in two spatial directions.

On account of the known longitudinal extension, the form of the sensor can then be determined in space in a three-dimensional fashion.

Figure 8:
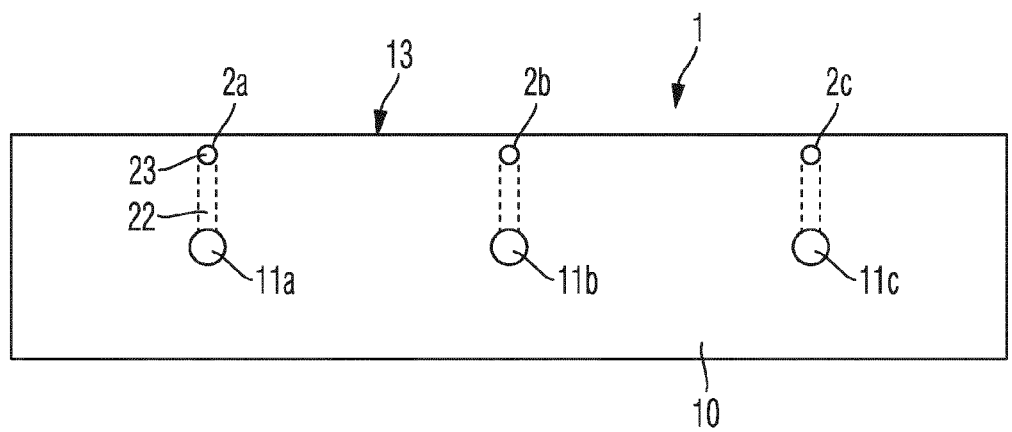
FIG. 8 shows by way of example an embodiment of the cross-section of a sensor having a rectangular cross-section.

FIG. 8 shows a further cross-section of a sensor 1 according to the invention. The sensor 1 according to FIG. 8 has an approximately rectangular cross-section of the cladding 10. Three first cores 11a, 11b and 11c are arranged in the cladding 10 and extend approximately parallel to one another. At least one second core 2a, 2b and 2c is coupled to each first core. In the present case, the second cores 2a, 2b and 2c are guided close to the surface 13 of the cladding 10, as explained in more detail by means of FIG. 4. In this way, the cores 2a, 2b and 2c can be used for the spectroscopic detection of molecules.

For example, the cladding 10 can form a boundary wall of a reactor or of a reaction vessel or of a conduit. In this way, it is possible to monitor the concentration of presettable molecules and thus the course of the reaction and/or the composition of the materials inside the vessel by integrated optical spectroscopy. Moreover, the thermally induced change in the length of the Bragg gratings allows to monitor the temperature inside the reaction vessel.

Of course, the invention is not limited to the embodiments shown in the drawings. Therefore, the above description should not be regarded as limiting but as explanatory. The following claims should be comprehended in such a way that a feature mentioned is available in at least one embodiment of the invention. This does not exclude the presence of further features. In so far as the claims and the above description define "first" and "second" features, this designation serves for distinguishing between two similar features, without determining an order.

The invention claimed is:

1. A fiber-optic sensor, comprising an optical waveguide, which has at least one first core and a cladding surrounding the first core, wherein the first core extends substantially over the entire length of the optical waveguide, wherein said sensor has at least one second core which is at least partly surrounded by the cladding, wherein the longitudinal extension of the second core is less than the total length of the optical waveguide and at least one Bragg grating is arranged in the second core, said at least one Bragg grating configured to reflect a portion of light guided in said second core, said reflected portion coupled to said first core such that a wavelength shift of said reflected portion due to temperature or mechanical strain can be detected.

2. The sensor according to claim 1, wherein the longitudinal extension of the second core shows:
at least one first longitudinal portion which is adapted to allow an optical coupling between the second core and the first core;
at least one third longitudinal portion which is guided at a greater distance from the first core than the first longitudinal portion; and
at least one second longitudinal portion, which connects the first longitudinal portion and the third longitudinal portion.

3. The sensor according to claim 2, comprising a plurality of second cores, each having a third longitudinal portion and are arranged at least at two different distances from the first core.

4. The sensor according to claim 1, wherein upon excitation with laser radiation of a first spectrum the first core is adapted to produce light of a second spectrum, wherein the second spectrum is greater than the first spectrum.

5. The sensor according to claim 1, wherein the first core contains a dopant.

6. The sensor according to claim 5, wherein the dopant is selected from any of erbium and/or ytterbium.

7. The sensor according to claim 2, wherein the first longitudinal portion of the second core geometrically overlaps a part of the first core.

8. The sensor according to claim 2, wherein the first longitudinal portion of the second core has a distance of less than about 3 µm or less than about 2.5 µm or less than about 2.0 µm from the first core.

9. The sensor according to claim 1, wherein at least one Bragg grating is arranged in the first core.

10. The sensor according to claim 2, wherein the third longitudinal portion of at least one second core has a distance of less than about 10 µm or less than about 5 µm or less than about 3 µm or less than about 2 µm or less than about 1 µm from the lateral surface of the optical waveguide.

11. The sensor according to claim 10, wherein at least two Bragg gratings are arranged in the third longitudinal portion of the second core.

12. The sensor according to claim 10, wherein a subarea of the lateral surface of the optical waveguide is functionalized.

13. The sensor according to claim 1, wherein the angle between two adjacent second cores can be between about 90° and about 180°.

14. The sensor according to claim 1, wherein the angle enclosed in a radial direction between two adjacent second cores can be between about 90° and about 120°.

15. The sensor according to claim 1, comprising further any of an evaluation circuit being adapted to determine the form of the sensor and/or an evaluation circuit being adapted to determine the concentration of predefinable molecules on at least one subarea of the cladding of the sensor and/or an evaluation circuit being adapted to navigate a tool containing the sensor by comparing the actual form of the sensor with map data from a storage device.

16. A fiber-optic sensor, comprising an optical waveguide, which has at least one first core and a cladding surrounding the first core, wherein the first core extends substantially over the entire length of the optical waveguide, wherein
said sensor comprises further at least one second core which is at least partly surrounded by the cladding, wherein the longitudinal extension of the second core is less than the total length of the optical waveguide and at least one Bragg grating is arranged in the second core, wherein the longitudinal extension of the second core shows:
at least one first longitudinal portion which is adapted to allow an optical coupling between the second core and the first core;
at least one third longitudinal portion which is guided at a greater distance from the first core than the first longitudinal portion; and
at least one second longitudinal portion, which connects the first longitudinal portion and the third longitudinal portion.

17. The sensor according to claim 16, wherein the first core comprises a dopant.

18. The sensor according to claim 17, wherein the dopant is selected from any of erbium and/or ytterbium.

19. The sensor according to claim 16, wherein at least one Bragg grating is arranged in the first core.

20. The sensor according to claim 16, wherein the angle between two adjacent second cores can be between about 90° and about 180°.

21. The sensor according to claim 16, wherein the angle enclosed in a radial direction between two adjacent second cores can be between about 90° and about 120°.

22. The sensor according to claim 16, comprising further any of an evaluation circuit being adapted to determine the form of the sensor and/or an evaluation circuit being adapted to determine the concentration of predefinable molecules on at least one subarea of the cladding of the sensor and/or an evaluation circuit being adapted to navigate a tool containing the sensor by comparing the actual form of the sensor with map data from a storage device.

* * * * *